(12) United States Patent
Li et al.

(10) Patent No.: US 9,004,819 B2
(45) Date of Patent: Apr. 14, 2015

(54) INSTALLATION METHOD AND RECOVERY METHOD FOR OFFSHORE WIND TURBINE

(75) Inventors: Aidong Li, Nantong (CN); Hongyan Ding, Nantong (CN)

(73) Assignee: Daoda (Shanghai) Wind Power Investment Co., Ltd., Shanghai (CN)

( * ) Notice: Subject to any disclaimer, the term of this patent is extended or adjusted under 35 U.S.C. 154(b) by 0 days.

(21) Appl. No.: 13/380,715

(22) PCT Filed: Jul. 12, 2010

(86) PCT No.: PCT/CN2010/001033
§ 371 (c)(1),
(2), (4) Date: Dec. 23, 2011

(87) PCT Pub. No.: WO2011/097778
PCT Pub. Date: Aug. 18, 2011

(65) Prior Publication Data
US 2013/0121770 A1    May 16, 2013

(51) Int. Cl.
*E02B 17/02* (2006.01)
*B63B 9/06* (2006.01)
*B63B 35/00* (2006.01)
(Continued)

(52) U.S. Cl.
CPC ............... *E02B 17/02* (2013.01); *B63B 9/065* (2013.01); *B63B 35/003* (2013.01); *B63B 35/44* (2013.01); *F03D 1/001* (2013.01); *F03D 1/005* (2013.01); *F03D 11/045* (2013.01); *E02B 17/08* (2013.01); *B63B 2035/446* (2013.01);
(Continued)

(58) Field of Classification Search
CPC ....... E02B 17/02; E02B 17/08; Y02E 10/727; B63B 2035/446; F03D 11/045

USPC ................ 405/196, 200, 203–207, 209, 224; 290/55; 114/258, 264
See application file for complete search history.

(56) References Cited

U.S. PATENT DOCUMENTS 4,080,798 A * 3/1978 Reusswig et al. ............. 405/217
4,587,918 A * 5/1986 Burg ........................... 114/67 A
(Continued)

FOREIGN PATENT DOCUMENTS

| CN | 101169108 A | 4/2008 |
|---|---|---|
| CN | 101493078 A | 7/2009 |

(Continued)

OTHER PUBLICATIONS

International Search Report, International Application PCT/CN2010/001033, dated Apr. 14, 2011, 3 pages.

*Primary Examiner* — Benjamin Fiorello
*Assistant Examiner* — Carib Oquendo
(74) *Attorney, Agent, or Firm* — Cesari and McKenna, LLP

(57) ABSTRACT

A method for installation of an offshore wind turbine. The method includes prefabrication of a foundation that provides buoyant force and uprighting force to the foundation so as to keep it upright without external forces. The method further includes installation on a dock that includes assembling the offshore wind turbine into a complete set, and finishing testing in a state of the complete set. The method further includes transporting the complete set to an offshore site in a way of floating on the water, and then offshore installation that includes sinking the complete set onto a sea bed by gravity on the offshore site, and fixing the foundation to finish the installation. The present invention also provides a method for recovery of an offshore wind turbine, which is performed generally in steps reversed to the method for installation.

17 Claims, 4 Drawing Sheets

(51) Int. Cl.
  *B63B 35/44* (2006.01)
  *F03D 1/00* (2006.01)
  *F03D 11/04* (2006.01)
  *E02B 17/08* (2006.01)
(52) U.S. Cl.
  CPC ........ *F05B 2240/90* (2013.01); *F05B 2240/95* (2013.01); *Y02E 10/727* (2013.01); *Y02T 70/146* (2013.01)

(56) References Cited

U.S. PATENT DOCUMENTS 7,496,434 B2 * 2/2009 Fossen et al. ................... 701/21

2004/0169376 A1 * 9/2004 Ruer et al. ..................... 290/55
2007/0102940 A1 * 5/2007 Hansen ........................... 290/55
2011/0091287 A1 * 4/2011 Polo et al. ..................... 405/204

FOREIGN PATENT DOCUMENTS

| CN | 101736748 A | 6/2010 | |
|---|---|---|---|
| CN | 101748731 A | 6/2010 | |
| CN | 101748743 B | 4/2011 | |
| CN | 101591918 B | 7/2013 | |
| EP | 1288122 B1 | 5/2010 | |
| WO | WO 2009/154472 | * 12/2009 | .................... 405/207 |

* cited by examiner

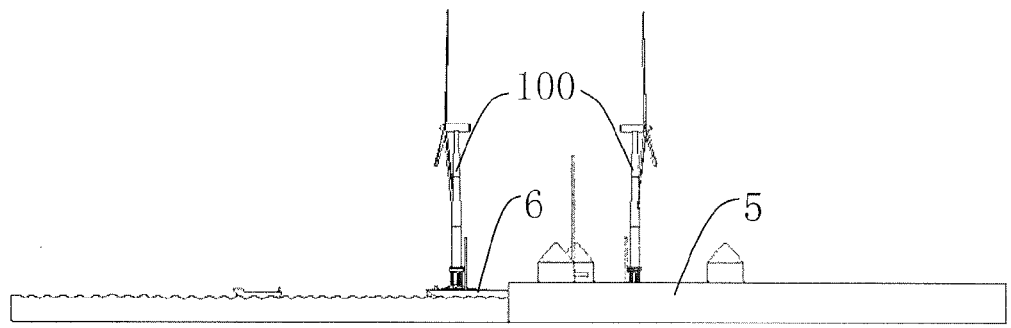
Figure 5
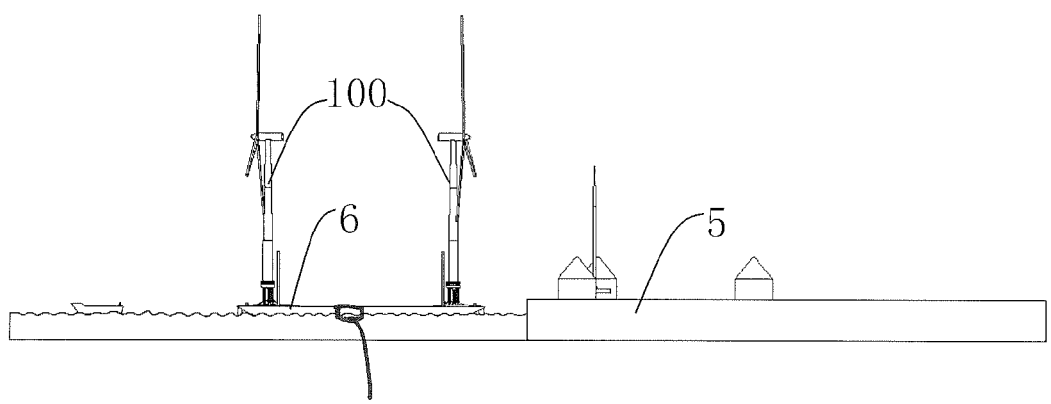
602  Figure 6

INSTALLATION METHOD AND RECOVERY METHOD FOR OFFSHORE WIND TURBINE

RELATED APPLICATIONS

The present application is a 371 of International Application No. PCT/CN2010/001033 filed Jul. 12, 2010 by JIANGSU DAODA OFFSHORE WIND CONSTRUCTION TECHNOLOGY CO., LTD, for an Installation method and recovery method for offshore wind turbine, which is hereby incorporated by reference in its entierty.

TECHNICAL FIELD

The invention relates to techniques for installation of an offshore wind turbine, and especially to methods for installation and recovery of a one-step offshore wind turbine.

BACKGROUND

In nature, wind energy is an energy source that is renewable, pollution free and of large reserves. Along with global warming and energy crisis, development and utilization of wind energy are sped up to minimize the discharge of greenhouse gases such as carbon dioxide in various countries, so as to protect the earth we live upon. Utilization of wind energy is mostly in forms of wind power and wind power generation, in which the wind power generation is predominant.

Currently, The technique for construction of offshore wind power divides the main construction into foundation work, offshore installation, and complete appliance test. Structure type employed by the offshore wind power foundation in construction is generally mono-pile foundation, multi-pile foundation, gravity type and jacket type foundations. Methods of installation include sectional hoisting and complete hoisting and so forth. Test is generally performed using offshore test, which results in high cost on foundation work and offshore construction since most construction of offshore wind power are accomplished on the offshore, which increases in a larger degree the investment cost on the offshore wind turbine foundation construction than on the onshore foundation and limits the development of offshore wind power.

With reference to Chinese Patent Application Publication No. CN101169108A, published on Apr. 30, 2008, which discloses an offshore wind turbine tower with structure of an integral design of wind tower foundation and the wind turbine tower frame and the generating set. The offshore construction of the offshore wind turbine tower is completed with a one-step installation of the whole wind turbine tower. The offshore wind turbine tower of the present invention has a bottom that is mono-cylinder suction anchor foundation or multi-cylinder suction anchor foundation, and a ballast tank is provided on the top of the suction anchor which adjusts the center of gravity of the entire offshore wind turbine tower by filling steel emery therein, and controls the center of gravity of the entire wind turbine tower on the suction anchor foundation, so as to readily reverse the wind turbine tower under the gravity from a horizontal position to a vertical state for the convenience of sinking during installation. However, in this method of installation, the generating set is stored in a toppled state during transportation which is different from the state during use, and possibly causes damage to the precise wind generating set. In addition, the large scale posture transition between transportation and offshore installation is required, i.e. the transition from the vertical posture to the horizontal posture, which not only requires higher structural strength of wind turbine tower but also needs large specific equipments for operation and which is even inoperable for a large wind turbine tower.

Therefore it is necessary to make improvement to overcome the existing technical problems.

SUMMARY OF THE INVENTION

The present invention is to solve the problems of high cost on work and installation of the existing offshore wind turbine foundation, large influence by oceanic conditions, high risk and long construction period.

In order to solve the problems above, the present invention provides technical solutions as follows.

1: A method for installation of an offshore wind turbine, comprising the steps of:

a step for prefabrication of a foundation, comprising: fabricating the foundation which comprises a plurality of tanks providing buoyant force and uprighting force to the entire structure so as to keep it upright without external forces;

a step for installation on the dock, comprising: launching the foundation on water; installing a tower column and a wind turbine set on the foundation into a complete set, and finishing the test in a state of complete set;

a step for transportation, comprising: fixing the complete set onto an installation vessel by a fixing system, and wherein the complete set floats on the water when the foundation is injected with air, and is transported to the offshore site by means of the installation vessel, and a pitch sensor and a roll sensor are respectively provided on the foundation and the vessel body, and the installation vessel adjusts the ballast of vessel body by a control system during transportation of the complete set; and a step for offshore installation, comprising: releasing the fixing system on the offshore site, releasing the air inside the foundation, sinking the complete set onto the sea bed by gravity, and fixing the foundation to finish the installation.

Solution 2: A method according to any one of the above solution, wherein the step for transportation comprises hoisting the complete set to a design height by a hoist, and fixing the upper tower column by the fixing system.

Solution 3: A method according to any one of the above solutions, wherein the step for prefabrication of the foundation comprises pre-exploring the offshore site to make sure the installation requirements, designing the foundation to a circular or polygonal structure based on the installation requirements, and fabricating the foundation on the land prefabrication site, and then going through the structural test and passing quality inspection.

Solution 4: A method according to any one of the above solutions, wherein the plurality of tanks comprises at least one middle tank and a plurality of side tanks, the plurality of side tanks being further away from the geometrical center of the foundation than the at least one middle tank, the at least one middle tank providing the majority of buoyancy after launching of the foundation, and the side tanks providing uprighting force to control the stable floating of the foundation and object fixed on the foundation.

Solution 5: A method according to any one of the above solutions, wherein the step for designing the foundation based on the installation requirements of the offshore site comprises designing the ratio of the height of center of gravity for the complete set to the diameter or polygonal span of the foundation to be not greater than 0.3, the diameter of the foundation being not less than 20 meters.

Solution 6: A method according to any one of the above solutions, wherein the step for installation on the dock comprises: injecting the compressed air into the tank of the foundation after launching of the prefabricated foundation; the foundation being floating by means of its own buoyancy and the uprighting structure, and being hauled to the dock by a tug and fixed.

Solution 7: A method according to any one of the above solutions, wherein the step for installation on the dock comprises hoisting the tower column, blades and a head of the wind turbine on the foundation in sequence using the shore-based hoist, finishing the assembly of the wind turbine and the live test of the wind turbine set.

Solution 8: A method according to any one of the above solutions, wherein the step for transportation comprises transporting the complete set to the wind turbine installation vessel, hoisting the complete set to a predetermined design height by a hoist, and fixing the upper tower column.

Solution 9: A method according to any one of the above solutions, wherein the step for transportation comprises the installation vessel transporting the wind turbine to start transportation and transporting to the site using a tug.

Solution 10: A method according to any one of the above solutions, wherein the step for offshore installation comprises releasing the fixing system, lowering the complete set by a hoist, opening vent valves and releasing the air from the tanks of the foundation, and sinking the complete set onto the sea bed by gravity Solution 11: A method according to any one of the above solutions, wherein the step for transportation comprises monitoring the relative displacement between the complete set and the vessel body by a positioning system, ensuring the longitudinal verticality using a traction system between the vessel body and the complete set.

Solution 12: A method according to any one of the above solutions, wherein the step for offshore installation comprises realizing the accurate positioning by a positioning system, and fixing the complete set by means of anchoring and dynamic positioning, etc.

Solution 13: A method according to any one of the above solutions, wherein the method for sinking the complete set onto the sea bed is selected from the group consisting of gravitational settling method, ground-breaking settling method and negative pressure settling method.

Solution 14: A method according to any one of the above solutions, wherein the step for offshore installation comprises negative pressure foundation treatment and/or gravity ballast foundation treatment so as to make the bearing capacity of soil meet the design requirement.

Solution 15: A method according to any one of the above solutions, wherein the step for offshore installation comprises levelling the foundation to the design requirement.

Solution 16: A method for recovery of an offshore wind turbine, comprising the steps of a step for offshore floating, comprising: providing a rising buoyancy for a foundation by injecting the compressed air inside the foundation, uprighting the wind turbine complete set by a fixing system of an installation vessel to avoid overturn, and fixing the wind turbine complete set to the installation vessel after floating of the foundation is finished;

a step for transportation, comprising: fixing the wind turbine complete set to the installation vessel by the fixing system, transporting the wind turbine complete set away from the offshore site by the installation vessel, while the air is continuously injected into the foundation to float the wind turbine complete set on the water, a pitch sensor and a roll sensor being respectively provided on the foundation and the vessel body, the installation vessel adjusting the ballast of vessel body by a control system during transportation of the wind turbine complete set; and a step for operation on the dock, comprising: repairing or disassembling the wind turbine on the dock.

Solution 17: A method according to Solution 16, wherein the step for offshore floating comprises injecting high pressure water to loose the foundation from the sea bed.

It is possible to realize one-step installation and disassembly for the complete set according to the methods of the present invention, such that offshore operation eliminates the need for large hoisting machinery and transportation vessels, it is readily operable for large offshore wind turbine, the operation can be easily performed with high ratio of success, and the cost of installation is greatly reduced than the existing technique. Since the foundation, tower column and wind turbine set remain in the same position from fabrication and transportation to use, which minimizes the risk of damage on each components of the wind turbine, and thus lowers the requirements for structural resistance to damage and further reduces the cost of fabrication. Moreover, the solutions of the present invention have advantages such as low construction noise, small area of sea bed disturbance, and no pollutant leakage during offshore operation and are environment-friendly.

DESCRIPTION OF THE DRAWINGS

The present invention will become more apparent with reference to the detailed description of the preferred embodiments along with the accompanied drawings, the same numeral references represent the same parts in the drawings, in which:

FIG. 5 is a schematic view for a complete wind turbine mounted to the installation vessel according to an embodiment of the present invention;

FIG. 6 is a schematic view for transportation of the complete wind turbine according to an embodiment of the present invention.

CALLOUT

| | | | |
|---|---|---|---|
| complete set | 100 | foundation | 1 |
| tank | 10 | side tank | 101, 102, 103, 104 |
| middle tank | 108 | pile cap | 12 |
| tower column | 2 | wind turbine set | 3 |
| blade | 30 | turbine head | 32 |
| tug | 4 | dock | 5 |
| Installation vessel | 6 | | |

DESCRIPTION OF THE EMBODIMENTS

A method for installation of an offshore wind turbine according to an embodiment of the present invention comprises a step for prefabrication of a foundation, a step for installation on the dock, a step for transportation and a step for offshore installation.

In the step for prefabrication of the foundation, the foundation is fabricated on the land prefabrication site, and then goes through the structural test and into the next procedure after quality acceptance. The foundation structure is prefabricated on the land, so as to solve the problems of excessive limitations on offshore construction, high cost, difficulty of quality control and high risk, etc.

Figure 1:
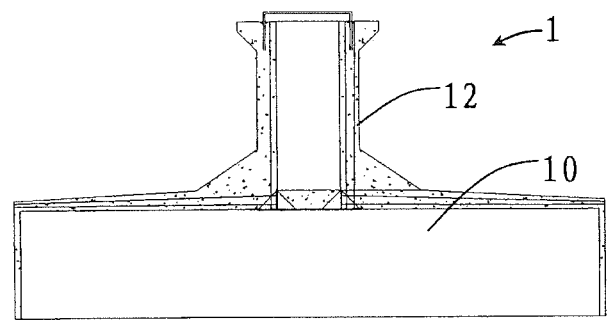
FIG. 1 is a schematic view of a foundation structure according to an embodiment of the present invention.
Figure 2:
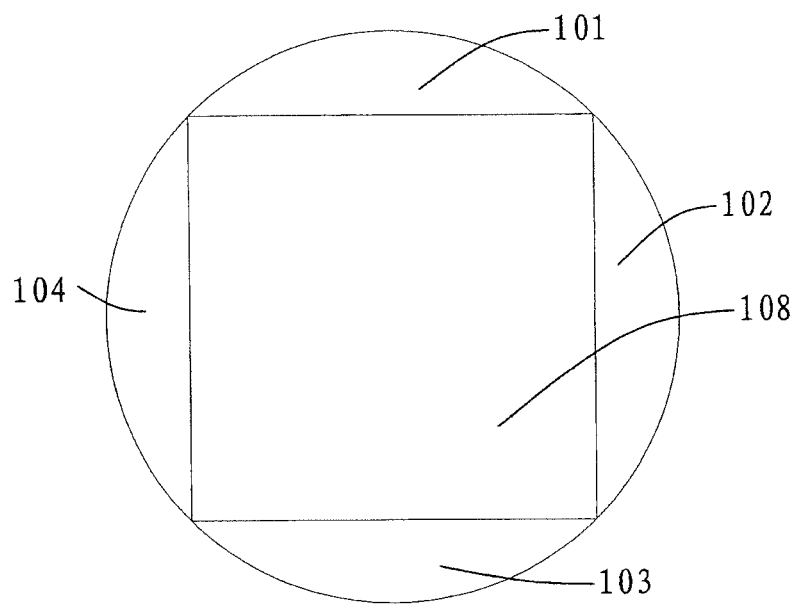
FIG. 2 is a schematic view of a foundation divisional tank structure according to an embodiment of the present invention.

In preferred embodiments, the offshore site is pre-explored to determine installation requirements according to which the structure of the foundation is designed. The structure of the foundation is generally columnar with cross section of circular or polygonal or other shapes. With reference to FIGS. 1 and 2, in an embodiment, the foundation 1 comprises a tank 10 and a pile cap 12. The tank 10 comprises a middle tank 108 and four side tanks 101, 102, 103, 104. The middle tank 108 is adjacent to the center of the foundation 1, or designed into a plurality of separated tanks so as to provide better structural strength and controllable degree. The four side tanks 101, 102, 103, 104 are further away from the center of the foundation 1 than the middle tank 108. At least one middle tank 108 provides the majority of buoyancy after launching of the foundation 1, and as uprighting structure, the plurality of side tanks 101, 102, 103, 104 provide the uprighting force to control the stable floating of the foundation 1 and objects fixed on the foundation 1. Preferably, the diameter or polygonal span of the foundation 1 is not less than 20 meters, so as to satisfy the requirements of floatability and stability for transportation and offshore installation and during use. An adequate weight for the structure of the foundation 1 is designed so as to possess a dead weight large enough, and ensure the center of gravity of the complete set 100 not higher than the pile cap 12 in consideration of the structure and weight of a tower column 2 and a wind turbine set 3 in advance. Preferably, the ratio of the height of center of gravity for the complete set 100 to the diameter or polygonal span of the foundation is not greater than 0.3, so that the complete set 100 has good floatability and stability for convenience of offshore installation.

Figure 3:
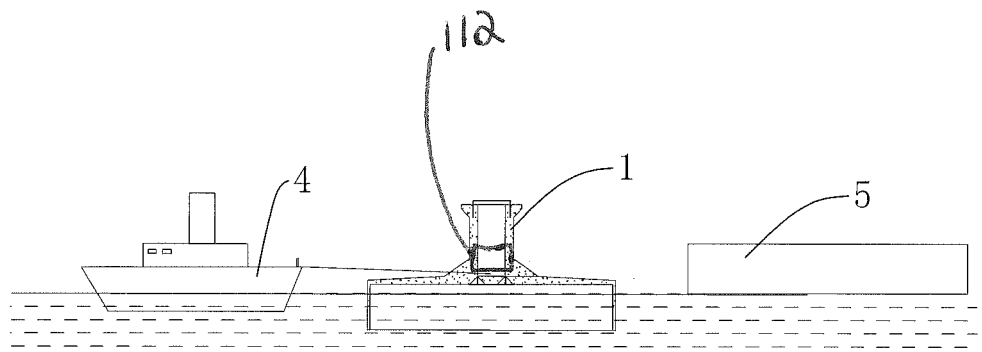
FIG. 3 is a schematic view for hauling of the foundation according to an embodiment of the present invention.
Figure 4:
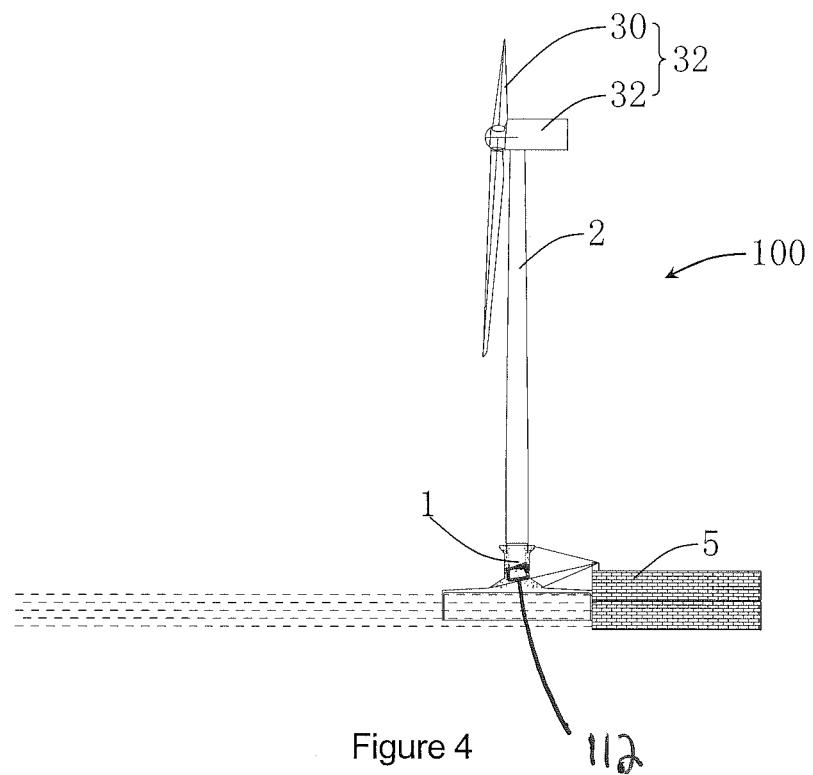
FIG. 4 is a schematic view for the complete wind turbine installed on the dock according to an embodiment of the present invention.

With reference to FIGS. 3 and 4, in the step for installation on the dock, the foundation 1 is launched, with the compressed air injected into the tank 10 of the foundation 1, and floats using its own buoyancy and uprighting structure of the foundation 1, and is hauled to the dock 5 for installation using a tug 4, and preferably the foundation 1 is fixed to the dock 5. The tower column 2 and the wind turbine set 3 are installed on the foundation 1 and assembled into a complete set 100 on the dock 5. Specifically, a shore-based hoist (not shown) hoists the tower column 2, blades 30 and a turbine head 32 in sequence on the foundation 1, and accomplishes the assembly. Preferably, the tower column 2 is in a hollow circular column shape. More preferably, the tower column 2 is partly tapered, with the lower diameter thereof larger than the upper diameter. Such tower column 2 has good structural strength, and small dead weight, which facilitates the decrease of center of gravity of the complete set 100 while satisfying the strength requirement. In the preferred embodiments, all or part of the test in the state of complete set is accomplished on the dock 5, including the live test of the wind turbine set 3.

Because the assembly and test are accomplished for the complete set 100 (including the foundation structure) on the dock 5, it is possible to operate using onshore hoisting equipments. Relative to the offshore hoisting equipments, the onshore hoisting equipments are more simple, low-rent, and convenient to maintain and have high reliability. All or part of test are accomplished on the land, which, comparing with the offshore test, will increase the efficiency of test and provide better maintenance support and accessories, with short period and good environment for test, low intensity of work and cost of operation.

With reference to FIGS. 5 and 6, in the step for transportation, the complete set 100 is transported to a wind turbine installation vessel 6, and fixed to the installation vessel 6 by a fixing system. In a specific embodiment, the complete set 100 floats on the water with the air injected into the foundation 1. Moreover, the complete set 100 is hoisted to the design height by a hoist and fixed to the upper tower column 2 by the fixing system. The complete set 100 is transported to the offshore site using the installation vessel 6, and a pitch sensor 112 and a roll sensor 602 are respectively provided on the foundation 1 and the vessel body 6 as seen in FIGS. 3, 4, and 6, and the installation vessel 6 adjusts the ballast of the vessel body 6 by a control system during transportation of the complete set 100. Preferably, the relative displacement between the complete set 100 and the vessel body 6 is monitored by a positioning system, and the longitudinal verticality is ensured using a traction system between the vessel body 6 and the wind turbine complete set 100.

Since the precision equipment of the wind turbine are expensive, and the tilting is often not allowed, or otherwise the wind turbine 3 will be damaged. Moreover, the foundation 1 and the tower column 2 often adopt the low cost steel-concrete structure which is suitable for higher compression stress but relative smaller tension stress. Therefore, the verticality of the wind turbine 3 should be maintained during transportation to facilitate the decrease of the risk for damaging the wind turbine 3 and the complete set 100. The structures of the wind turbine 3, the tower column 2 and even the foundation 1 need improvement if it is desirable for the complete set 100 to undergo the tilting posture, which increases the cost. The specific transportation installation vessel 6 is used in the present invention which utilizes the hoist to upright the foundation of the wind turbine, with the upper part uprighted by a truss. Preferably, a multipoint sensor is installed on the wind turbine complete set 100 and the installation vessel 6, so that the complete set 100 remains in the same vertical position during transportation as that during use. As the foundation 1, the tower column 2 and the wind turbine set 3 remain in the same position from fabrication and transportation to use, which minimizes the risk for damaging the wind turbine complete set 100. In addition, as the foundation 1 itself provides buoyant force, it is allowable for the transportation vessel to eliminate or reduce the load of weight of the wind turbine complete set 100 during transportation, which largely lowers the requirement for carrying capacity of the transportation vessel and the cost of transportation.

Figure 7:
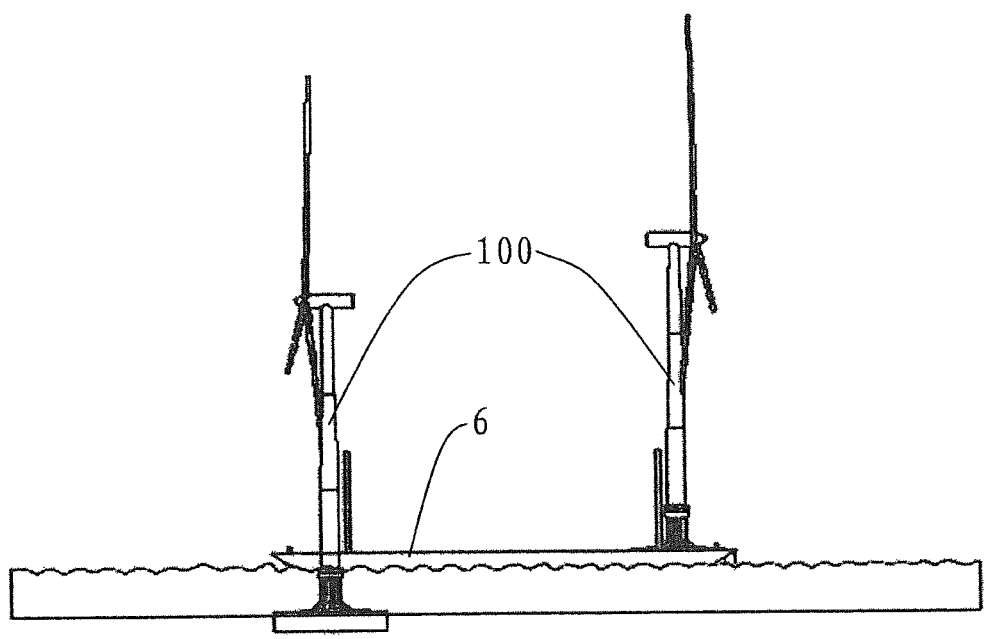
FIG. 7 is a schematic view for offshore installation of the complete wind turbine according to an embodiment of the present invention.

After the complete set 100 is transported to the offshore site, with reference to FIG. 7, the step for offshore installation is performed, comprising: releasing the fixing system on the offshore site, releasing the air inside the tank 10 of the foundation 1 to reduce the buoyancy, sinking the complete set 100 onto the sea bed by gravity, and fixing the foundation 1 to finish the installation. The sea water can enter the foundation 1 as the air inside the tank 10 of the foundation 1 is released, and the complete set 100 is sunk just by its own gravity without using large construction machinery to sink the foundation 1. In a preferred embodiment, pipes and valves communicating with the tank 10 are provided in advance in the foundation 1. When the fixing system is released, the vent valves of the foundation 1 is opened to release the air and the complete set 100 is lowered down by the hoist and sunk onto the sea bed by gravity. The hoist on the installation vessel uprights during the installation to ensure the safety of sinking and the verticality of installation. Preferably, the accurate positioning is realized by a positioning system, and the position is fixed by means of anchoring and dynamic positioning, etc. Preferably, the complete set 100 is installed to the design depth by the means the combined method of gravitational settling, ground-breaking settling and negative pressure settling. After sunk to the predetermined position, the foundation 1 is leveled to the design requirement, and the bearing capacity of soil satisfies the design requirement by means of negative pressure foundation treatment and/or gravity ballast foundation treatment. The longitudinal verticality and bearing capacity of the foundation after installation can be realized using accessory machinery on the installation vessel 6 and employing various settling techniques and foundation treatment techniques to sink the soil surface.

Some of methods for sinking and reinforcement of the foundation are disclosed in the prior art, for example, the methods for sinking of a foundation are disclosed in Chinese Invention Patent Application No. 200910244841.6, entitled "a method for sinking of a thick wall cylindrical foundation by injecting air and breaking ground" and Chinese Invention Patent Application No. 200910244849.2, entitled "a method for sinking of a cylindrical foundation by replacing water with air". And the methods for reinforcement of a foundation are disclosed in Chinese Invention Patent Application No. 200910244844.X, entitled "a method for reinforcement of a cylindrical foundation groundwork by replacing water with air" and Chinese Invention Patent Application No. 200910069424.2, entitled "a method for reinforcement of a groundwork based on the cylindrical foundation negative pressure technique", see those applications in detail and it will not be repeated herein any more.

If the wind turbine 3 needs repair for some failures occurred, or needs replacement as the term of service is due, the offshore wind turbine are integrally recovered with generally reversed procedures. The method for recovery of the offshore wind turbine comprises a step for offshore floating, a step for transportation and a step for operation on the dock.

In the step for offshore floating, rising buoyancy is provided for the foundation by injecting the compressed air inside the tank 10 of the foundation 1. Preferably, the step for offshore floating comprises injecting high pressure water to loose the foundation 1 from the sea bed. The wind turbine complete set 100 is uprighted by the fixing system of the installation vessel 6 to avoid overturn, and the wind turbine complete set 100 is fixed to the installation vessel 6 after floating of the foundation 1 is finished. As the complete set 100 rises just by its own buoyancy, without using large construction machinery to hoist the foundation, which minimizes the cost of construction.

In the step for transportation, the wind turbine complete set 100 is fixed to the installation vessel 6 by the fixing system, and the wind turbine complete set 100 is transported away from the offshore site by the installation vessel 6, while the air is continuously injected into the foundation 1 to float the wind turbine complete set 100 on the water, and a pitch sensor 112 and a roll sensor 602 are respectively provided on the foundation 1 and the vessel body 6 as seen in FIGS. 3, 4, and 6. Similar to the above, as the foundation 1, the tower column 2 and the wind turbine set 3 remain in the same position as that during use, which minimizes the risk for damaging the wind turbine complete set 100. In addition, as the foundation 1 itself provides buoyant force, it is allowable for the transportation vessel 6 to eliminate or reduce the load of the weight of the wind turbine complete set 100 during transportation, which largely lowers the requirement for carrying capacity of the transportation vessel 6 and the cost of transportation.

In the step for operation on the dock, the wind turbine is repaired or disassembled on the dock. Similar to the above, all of these repairs or disassembly can be accomplished using the shore-based equipments on the dock, which, comparing with the offshore operation, reduces the cost of equipments, provides good operating condition and facilitates the reduction of construction cost.

The one-step installation and disassembly for the complete set can be realized according to the method of the present invention, which has low risk for damaging the wind turbine complete set, with convenience and high efficiency, and greatly reduces the cost relative to the existing technique of installation. Moreover, the solutions of the present invention have advantages such as fewer vessels required, low construction noise, small area of sea bed disturbance, and no pollutant leakage during offshore operation and are environment-friendly.

The preferred embodiments of the present invention are disclosed as above, but are not used to limit the present invention, and any one skilled in the art can make possible alterations and modifications without departing from the spirit and scope of the present invention, which should be referred to the accompanied claims.

What is claimed is:

1. A method for installation of an offshore wind turbine, characterized in comprising the steps of:
    prefabrication of a foundation, including: fabricating the foundation which includes a plurality of tanks providing buoyant force and uprighting force to the foundation so as to keep the foundation upright without external forces;
    installation on a dock, including: launching the foundation on water, installing a tower column and a wind turbine set on the foundation into a complete set, and performing testing to the complete set on the dock;
    transportation, including: fixing the complete set onto an installation vessel by a fixing system, and wherein the complete set, fixed on the installation vessel, floats on the water when the foundation is injected with air, and is transported to an offshore site by means of the installation vessel, and a pitch sensor and a roll sensor are respectively provided on the foundation and a body of the installation vessel, and the installation vessel adjusts a ballast of the installation vessel transporting the fixed complete set to the offshore site utilizing information from the pitch sensor and the roll sensor during transportation of the complete set to maintain a vertical position of the complete set during transportation, where the installation vessel adjusts the ballast by a control system; and
    offshore installation, including: releasing the fixing system on the offshore site, releasing the air inside the foundation, sinking the complete set onto a sea bed by gravity, and fixing the foundation to finish the installation.

2. The method according to claim 1, wherein the step of transportation comprises: hoisting the complete set to a design height by a hoist, and fixing the tower column by the fixing system.

3. The method according to claim 1, wherein the step of prefabrication of the foundation comprises: pre-exploring the offshore site to make sure installation requirements, designing the foundation to a circular or polygonal structure based on the installation requirements, and fabricating the foundation on a land prefabrication site, and then going through the testing and passing quality inspection.

4. The method according to claim 1, wherein the plurality of tanks comprise at least one middle tank and a plurality of side tanks, the plurality of side tanks being further away from a geometrical center of the foundation than the at least one middle tank, the at least one middle tank providing buoyancy after launching of the foundation, and the plurality of side tanks providing the uprighting force to control stable floating of the foundation and objects fixed on the foundation.

5. The method according to claim 3, wherein designing the foundation based on the installation requirements of the offshore site comprises designing a ratio of a height of a center of gravity for the complete set to a diameter or polygonal span of the foundation to be not greater than 0.3, the diameter of the foundation being not less than 20 meters.

6. The method according to claim 1, wherein the step of installation on the dock comprises: injecting compressed air into at least one tank of the plurality of tanks of the foundation after launching of the prefabricated foundation, the foundation floating by means of buoyancy of the foundation and the uprighting force, and being hauled to the dock by a tug and fixed.

7. The method according to claim 6, wherein the step of installation on the dock comprises: hoisting the tower column, blades and a head of the wind turbine on the foundation in sequence using a shore-based hoist, finishing assembly of the wind turbine and the testing of the wind turbine set.

8. The method according to claim 1, wherein the step of transportation comprises: transporting the complete set to the installation vessel, hoisting the complete set to a predetermined design height by a hoist, and fixing the tower column.

9. The method according to claim 1, wherein the step of transportation comprises: transporting the wind turbine by the installation vessel, and transporting to the offshore site using a tug.

10. The method according to claim 1, wherein the step of offshore installation comprises: releasing the fixing system, lowering the complete set by a hoist, opening vent valves and releasing the air from at least one tank of the plurality of tanks of the foundation, and sinking the complete set onto the sea bed by gravity.

11. The method according to claim 1, wherein the step of transportation comprises: monitoring relative displacement between the complete set and the installation vessel by a positioning system, ensuring longitudinal verticality using a traction system between the installation vessel and the complete set.

12. The method according to claim 1, wherein the step of offshore installation comprises: realizing accurate positioning by a positioning system, and fixing the complete set by at least means of anchoring and dynamic positioning.

13. The method according to claim 1, wherein sinking the complete set onto the sea bed is selected from a group consisting of a gravitational settling method, a ground-breaking settling method, and a negative pressure settling method.

14. The method according to claim 1, wherein the step of offshore installation comprises: negative pressure foundation treatment and/or gravity ballast foundation treatment so as to make bearing capacity of soil meet a design requirement.

15. The method according to claim 1, wherein the step of offshore installation comprises: leveling the foundation to a design requirement.

16. A method for recovery of an offshore wind turbine complete set, characterized in comprising the steps of:
offshore floating, including: providing a rising buoyancy for a foundation by injecting compressed air inside the foundation, uprighting the offshore wind turbine complete set by a fixing system of an installation vessel to avoid overturn, and fixing the offshore wind turbine complete set to the installation vessel after floating of the foundation is finished;
transportation, including: fixing the offshore wind turbine complete set to the installation vessel by the fixing system, transporting the offshore wind turbine complete set away from an offshore site by the installation vessel, while the compressed air is continuously injected into the foundation to float the wind turbine complete set on the water, a pitch sensor and a roll sensor being respectively provided on the foundation and the installation vessel, the installation vessel, transporting the fixed complete set, adjusting a ballast of the installation vessel by a control system utilizing information from the pitch sensor and the roll sensor and during transportation of the wind turbine complete set, wherein relative displacement between the wind turbine complete set and the installation vessel by a positioning system and longitudinal verticality between the installation vessel and the complete set is ensured; and
operation on a dock, including: repairing or disassembling the wind turbine complete set on the dock.

17. The method according to claim 16, wherein the step for offshore floating comprises: injecting high pressure water to loosen the foundation from a sea bed.

* * * * *

UNITED STATES PATENT AND TRADEMARK OFFICE
CERTIFICATE OF CORRECTION

| | | |
|---|---|---|
| PATENT NO. | : 9,004,819 B2 | Page 1 of 1 |
| APPLICATION NO. | : 13/380715 | |
| DATED | : April 14, 2015 | |
| INVENTOR(S) | : Aidong Li et al. | |

It is certified that error appears in the above-identified patent and that said Letters Patent is hereby corrected as shown below:

In the Specification:
Col. 1, line 11 should read:
hereby incorporated by reference in its entirety.

Col. 1, line 29 should read:
Currently, the technique for construction of offshore wind Col. 6, lines 16-17 should read:
1 and a body of the installation vessel 6 as seen in FIGS. 3, 4, and 6, and the installation vessel 6 adjusts the ballast of the installation vessel 6 by Col. 6, line 20 should read:
plete set 100 and the installation vessel 6 is monitored by a posi- Col. 6, line 22 should read:
using a traction system between the installation vessel 6 and the Col. 7, line 60 should read:
dation 1 and the installation vessel 6 as seen in FIGS. 3, 4, and 6.

Signed and Sealed this
Eleventh Day of August, 2015

Michelle K. Lee
*Director of the United States Patent and Trademark Office*